UNITED STATES PATENT OFFICE.

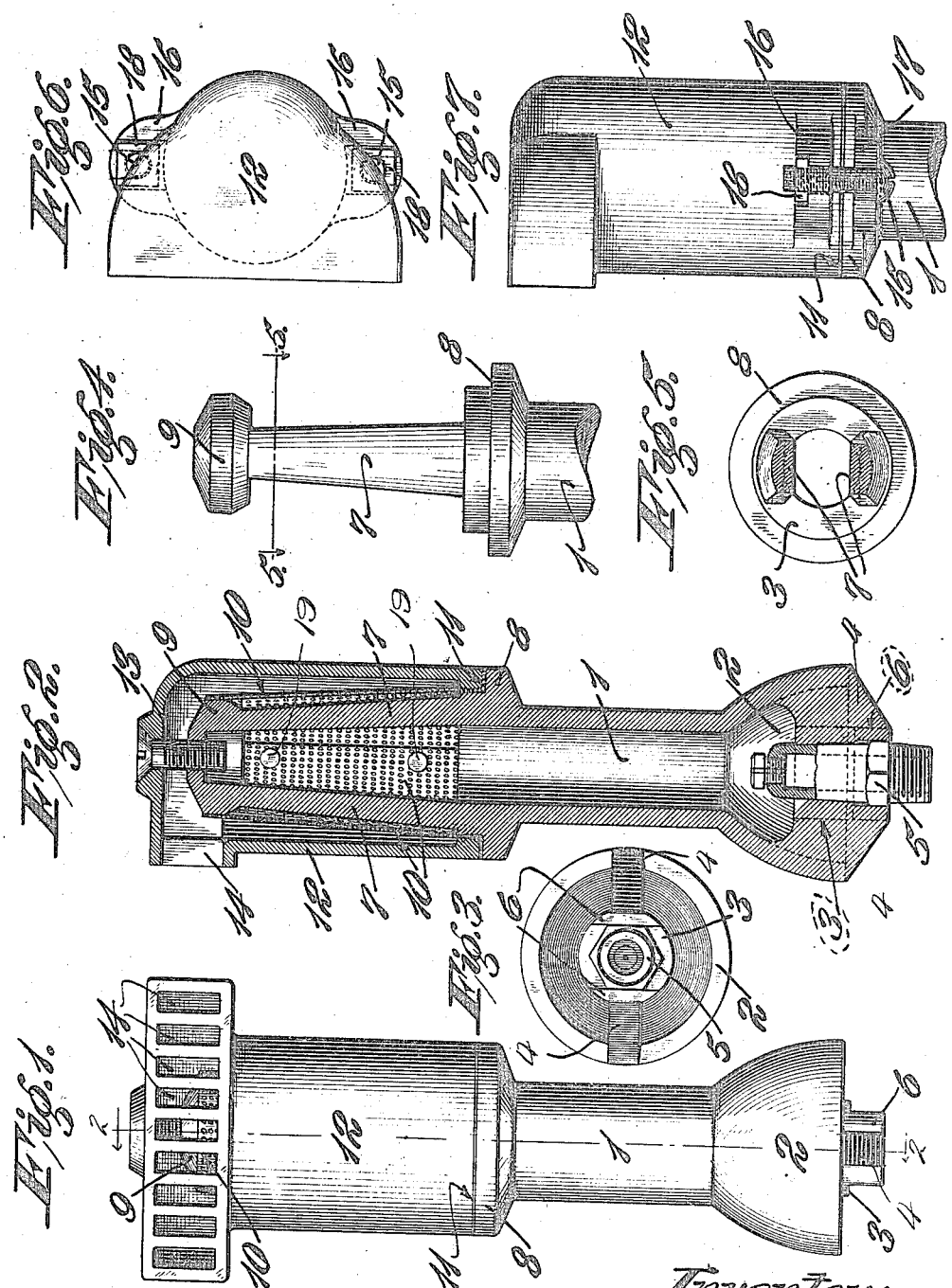

WILLIAM F. STEWART, OF ST. LOUIS, MISSOURI, ASSIGNOR TO AMERICAN WATER HEATER COMPANY, OF ST. LOUIS, MISSOURI, A CORPORATION OF MISSOURI.

GAS-BURNER.

1,269,333.  Specification of Letters Patent.  Patented June 11, 1918.

Application filed July 27, 1917. Serial No. 183,088.

*To all whom it may concern:*

Be it known that I, WILLIAM F. STEWART, a citizen of the United States, and a resident of the city of St. Louis and State of Missouri, have invented a new and useful Improvement in Gas-Burners, of which the following is a specification.

My invention relates to gas burners and particularly to that type of burner used in connection with gas water heaters, wherein the burners are mounted in batteries on a burner ring to heat the water in coils located above.

One of the objects of my invention is to provide an inexpensive burner of simple construction which may be easily removed from its mount and cleaned without difficulty. Another object is to provide a cylindrical burner with a smooth outer surface with simple means for holding it from turning when in position. A further object is to provide a flame-check for the burner which is clamped firmly in place and sealed at both ends.

The invention consists in the combinations and arrangements of parts hereinafter described and claimed. In the accompanying drawing, which forms part of this specification, like numerals refer to like parts whenever they occur.

Figure 1 is an elevation of a burner embodying my invention looking at the flame outlet side;

Fig. 2 is a vertical section taken through the burner on the line 2—2 in Fig. 1, showing the burner mounted on the burner spud;

Fig. 3 is a bottom plan view of the burner and spud;

Fig. 4 is an elevation of the upper portion of the mixing tube;

Fig. 5 is a horizontal section on the line 5—5 in Fig. 4;

Fig. 6 is a top plan view of a burner showing a modified form of clamping means; and Fig. 7 is a side elevation of the burner shown in Fig. 6.

Referring to Figs. 1 to 5 of the drawings, the burner comprises a tubular mixing tube 1 provided with a bell-shaped mixing chamber 2 at its bottom. Located in the bottom port on of the mixing chamber 2 is a ring 3 which is spaced away from the walls of the mixing chamber and is connected thereto by bridges 4. The ring is adapted to be slipped over the burner spud 5 which is positioned on the burner ring (not shown), and is provided with two downwardly projecting lugs 6 which engage the adjacent faces of the hexagonal shaped portion of the burner spud 5, thus preventing the burner from turning when positioned on the burner spud.

A pair of converging arms 7 extend upwardly from a shouldered flange 8 on the mixing tube and support the circular top 9 of the mixing tube. The side of the circular top 9 of the mixing tube is tapered and is of larger diameter at its bottom. A perforated conical shaped flame-check 10, whose larger end is flanged outwardly as at 11, is slipped over the circular top 9 of the mixing tube. The flange 11 of the flame check 10 rests on the flange 8 of the mixing tube. A cylindrical burner cap 12 surrounds the flame check and has its bottom resting on the flange 11 of the flame check 10. Located in the top surface of the burner cap 12 is a clamping screw 13, which projects into a screw-threaded hole in the circular top 9 of the mixing tube. This clamping screw clamps the flange 11 of the conical flame check 10 firmly between the bottom of the burner cap and the flange 8 of the mixing tube. The top portion of the burner cap is widened at its side and is provided with a number of horizontally extending passageways constituting flame outlets 14, adapted to project the flame horizontally.

In assembling the parts of the burner, the conical flame-check is slipped over the top of the mixing tube with its flanged end lowermost. The cap is then placed over both of these members, and then forced downwardly by tightening the clamping screw, thus clamping the flange of the bottom of the flame-check firmly between the bottom of the burner cap and the flange 8 on the mixing tube. This clamping of the flame check pulls it down until its top is even with the circular top 9 of the mixing tube. The circumferential face of the circular top 9 of the mixing tube, which is of slightly larger diameter than the upper end of the flame check is tapered to conform to the taper of the flame check. Thus, when the flame check is clamped into position, its smaller end tightly engages the periphery of the circular top, thus sealing the top of the flame check.

Figs. 6 and 7 illustrate a different means for clamping the flame check in position. The burner cap 12 is held in place by bolts 15 which are loosely mounted in vertical holes located in oppositely disposed, horizontally projecting lugs 16, on the bottom portion of the burner cap. The bolts 11 extend downwardly through vertical notches in the side of lugs 17. The lugs project outwardly from the flange 8 of the mixing tube and are in vertical alinement with the lugs 16 on the burner cap. The bolts 15 are screw-threaded and have a slotted head, which bears on the under side of the lugs 17. Said bolts are provided with nuts 18 which rest in pockets in the top surface of the respective lugs 16 and are prevented from turning by the walls of said pockets.

The gas is admitted to the mixing chamber through the burner spud and is mixed with the air which enters through the air inlets at the bottom of the mixing chamber. The properly mixed gases are then carried upwardly in the mixing tube and ignited, escape through the perforated flame-check and are directed outwardly through the flame outlets in the side of the burner cap. The flame outlets being located in the side of the burner cap prevents the burner from being flooded by condensation from the coils of the water heater.

One of the obvious advantages of my device is the fact that the conical flame-check may be easily made by rolling a sheet of foraminous material into a cone with its end openings of the size required to fit the burner tube, the overlapping ends of the sheet being fastened by rivets 19 as shown in Fig. 2.

I claim the following as my invention:

1. A gas burner comprising a vertical mixing tube having spaced conical surfaces, air and gas inlets for said mixing tube, a cap for the top of the mixing tube having flame outlets, a flame-check consisting of a foraminous sheet roller into a cone open at both ends, and fitting said conical surfaces of the mixing tube so as to seal the flame-check at its upper and lower ends.

2. A gas burner comprising a cylindrical mixing tube, a housing having flame outlets located on the upper portion of said mixing tube, a flame-check consisting of a foraminous conical shell, the upper end of said flame-check fitting over and being closed by the top of the mixing tube, and means for clamping the flame check firmly in position.

3. A gas burner comprising a mixing tube having air and gas inlets located in its bottom, a flame check consisting of a conical shell having perforated walls, said flame-check fitting over and adapted to be supported by the mixing tube, a cylindrical burner cap having flame outlets in its side near the top, and means located on the mixing tube for sealing the top of the flame check.

4. A gas burner comprising a mixing tube having air and gas inlets located at its bottom, a pair of oppositely disposed arms extending upwardly from the top of the mixing tube, a circular disk supported by said arms, a foraminous shell supported by the mixing tube and having one end smaller than the other, said small end being closed by the circular disk carried by the mixing tube, a housing for the foraminous shell having flame outlets, and means located on said housing for clamping the foraminous shell in position.

5. A gas burner for water heaters comprising a vertical mixing tube which is closed at its upper end, the upper portion of said mixing tube being open at the sides, air and gas inlets located in the bottom portion of the mixing tube, a flame-check consisting of foraminous material rolled into conical form and having its lapped ends fastened, the upper end of said flame-check fitting and being closed by said closed upper end of the mixing tube, a horizontal outwardly projecting flange located on the bottom of said flame check, a shouldered flange of the mixing tube adapted to act as a seat for the flame-check, a cylindrical cap having flame outlets in its side portion surrounding the flame-check and having its bottom edge resting on the flange of the flame-check, and means located on said cap for clamping the flange of the flame-check firmly between the bottom of said cap and the shouldered flange of the mixing tube.

6. A gas burner comprising a vertical mixing tube adapted to be mounted on the burner spud of a water heater, a flame-check mounted on the upper end of the mixing tube, a housing surrounding said flame-check, a widened mouth located in the side of the housing near its top, said mouth being provided with a plurality of horizontally extending passageways constituting flame openings, and means located on the bottom of the mixing tube to prevent rotation of the burner on the burner spud.

7. A gas burner for water heaters adapted to be mounted on the burner spuds, comprising a vertical mixing tube having a flame-check at its upper end, a housing for said flame-check having flame openings in one side near its top, the burner being provided with oppositely disposed lugs projecting downwardly from the bottom of the mixing tube, said lugs engaging the flat surfaces of the burner spud to prevent rotation of the burner on the burner spud.

8. A gas burner comprising a mixing tube, a tubular conical-shaped flame-check having its smaller end uppermost and adapted to be sealed by the upper end of the mixing tube, perforations in the walls of said flame-check, a horizontally outwardly projecting flange at the bottom of the flame-check, a flange located on the mixing tube to form a seat for the flame-check, a housing for said flame-check having flame outlets in its side wall, and a clamping screw loosely mounted in the top of said housing, said screw projecting downwardly and being threaded into the top portion of the mixing tube, whereby when the screw is tightened the flange on the bottom of the flame-check is clamped firmly between the bottom of the housing and the flange on the mixing tube.

9. A gas burner comprising a vertical mixing tube adapted to be mounted on the burner spud of a water heater, a flame-check mounted on the upper end of the mixing tube, a housing surrounding said flame-check, and a widened mouth located in the side of the housing near its top, said mouth being provided with a plurality of horizontally extending passageways constituting flame openings.

Signed at St. Louis, Missouri, this 18th day of July, 1917.

WILLIAM F. STEWART.

Copies of this patent may be obtained for five cents each, by addressing the "Commissioner of Patents, Washington, D. C."